United States Patent

Masuda et al.

[11] 4,202,257
[45] May 13, 1980

[54] COOKING APPARATUS

[75] Inventors: Teruo Masuda, Itsukaichi; Nobuhiko Watanabe, Tachikawa; Takeo Abe, Akikawa; Matsuhiro Koike, Hachioji; Masayasu Morita, Fuchu; Yoshio Oguma, Kiyose; Yoshiharu Hamaguchi, Fussa; Motonobu Hirata, Chiba; Mamoru Saito, Koganei; Kunio Onoguchi, Sayama; Kazuyuki Yamaguchi, Oume; Akira Hirose, Fuchu, all of Japan

[73] Assignee: France Bed Co., Ltd., Tokyo, Japan

[21] Appl. No.: 963,353

[22] Filed: Nov. 24, 1978

[51] Int. Cl.² .................................................. A23L 3/00
[52] U.S. Cl. .......................................... 99/348; 99/367
[58] Field of Search ............. 99/280, 281, 325, 329 R, 99/348–355, 367; 126/20, 20.1, 20.2, 34, 35; 219/400, 401

[56] References Cited

U.S. PATENT DOCUMENTS

| | | | |
|---|---|---|---|
| 2,145,482 | 1/1939 | Houlis | 126/20 |
| 2,860,225 | 11/1958 | Steen | 219/394 X |
| 3,492,938 | 2/1970 | Oxford et al. | 99/339 |
| 3,923,037 | 12/1975 | Donato | 126/39 C |
| 4,071,739 | 1/1978 | Jenn et al. | 219/400 |

Primary Examiner—Leonard D. Christian
Attorney, Agent, or Firm—Frishauf, Holtz, Goodman and Woodward

[57] ABSTRACT

A cooking apparatus comprises an apparatus housing divided by a partition plate into upper and lower chambers. An oven chamber is defined in the lower chamber and has a baking heater therein. A vessel having a kneading blade is disposed on the upper chamber. The upper chamber includes a drive mechanism for rotating the blade. A fermenting heater is provided below the bottom of the vessel to heat the interior of the vessel to a fermenting temperature. Dough is kneaded and fermented in the vessel and baked in the oven chamber. Another fermenting heater is disposed in the oven chamber to preheat the interior of the oven chamber for baking, while the dough is being kneaded and fermented in the vessel.

5 Claims, 9 Drawing Figures

COOKING APPARATUS

BACKGROUND OF THE INVENTION

This invention relates to cooking apparatus, and in particular to cooking apparatus capable of effecting a kneading step, fermenting step and baking step either separately or in a continuous way.

Recently, the hand-making of a food such as a mothi (Japanese rice cake), noodle, bread etc. is in vogue among the general household. However, a known cooking apparatus can normally perform only one or two of a kneading step, fermenting step and baking step. For example, an electric mochi making apparatus can perform only a kneading step and an electric oven can perform one or both of a fermenting step and baking step. For example, a break making apparatus includes all the three steps. A bread is made by kneading dough while adding yeast fungi, warming to a fermenting temperature of about 38° C. for about 50 minutes, and baking the fermented dough at the baking temperature of about 250° C. in an oven. In a food such as a bread requiring all three steps, an electric mochi making apparatus for kneading and an oven for fermentation and baking are necessary and all the three steps can not be performed continuously in a single apparatus. There is a growing demand for a cooking apparatus which can perform all three steps. Japanese Utility Model Publication No. 7352/76 discloses such apparatus.

This prior apparatus comprises a kneading vessel for automatically kneading dough by a kneading blade, a fermenting chamber disposed above the kneading vessel to warm the kneaded dough for fermentation, and an oven disposed above the vessel to bake the fermented dough. The kneading, fermenting and baking of the dough can be effected automatically under predetermined conditions. However, the apparatus becomes bulky, since the individual steps are separately effected in the respective sections of apparatus. Furthermore, a dough needs to be moved from one section to another during the making process of a bread. Thus, a combersome operation is involved and, moreover, there is a risk that the dough will be cooled and degraded during the movement from one section to another of the apparatus. A certain amount of skill is also required.

SUMMARY OF THE INVENTION

To overcome the drawbacks of the prior art, a cooking apparatus of this invention comprises a housing divided by a partition plate into upper and lower chambers, and an oven chamber defined in the lower chamber and having a baking heater therein. A vessel is disposed on the upper chamber and having an agitating/kneading blade detachably mounted in the bottom of the vessel, and a drive mechanism is disposed in the upper chamber to rotate the blade in the vessel. A fermenting heater is provided below the bottom of the vessel to warm the vessel to a fermenting temperature. Dough can be simultaneously kneaded and fermented in the same vessel, and then baked on the oven chamber. If the oven chamber is preheated by another fermenting heater in the oven chamber before baking the dough in the oven chamber, the degradation of the dough during the movement of the dough from the vessel to the oven chamber can be prevented.

The above and further objects and novel features of the invention will more fully apparent from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
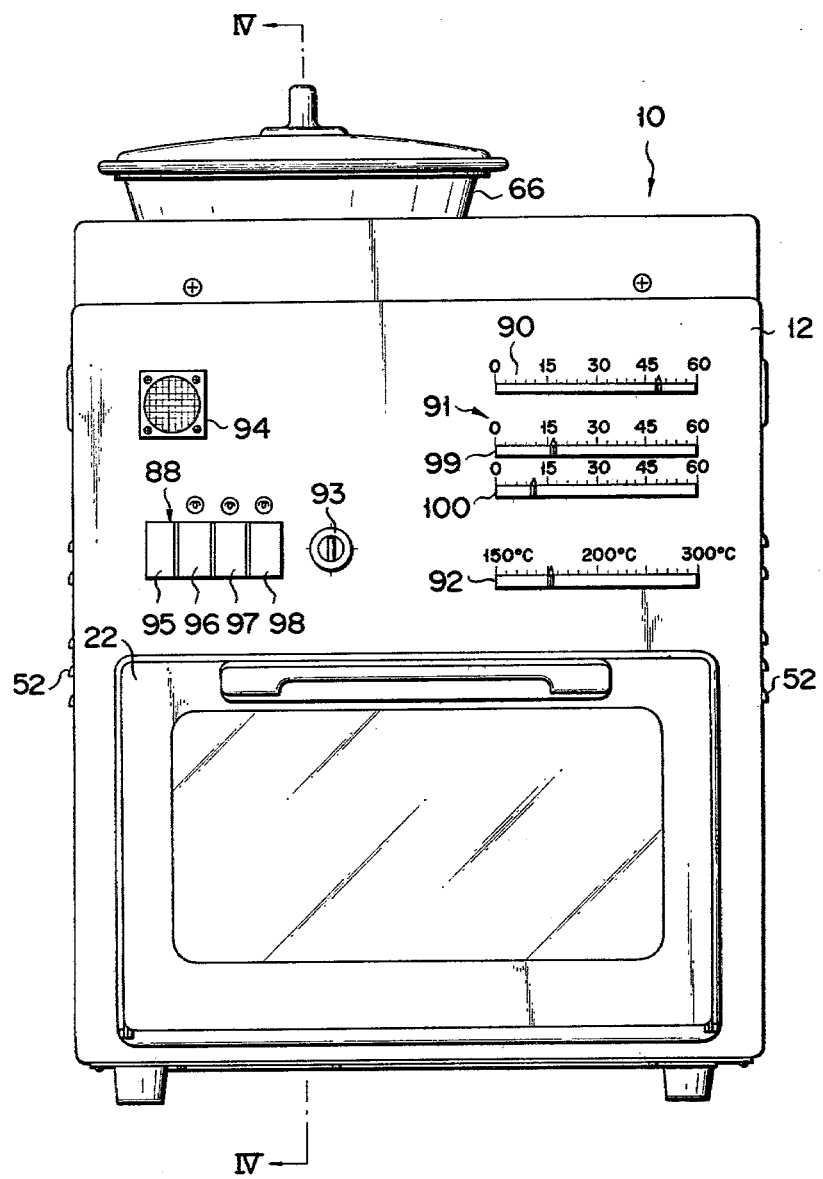
FIG. 1 is a front view showing a cooking apparatus according to one embodiment of this invention.
Figure 2:
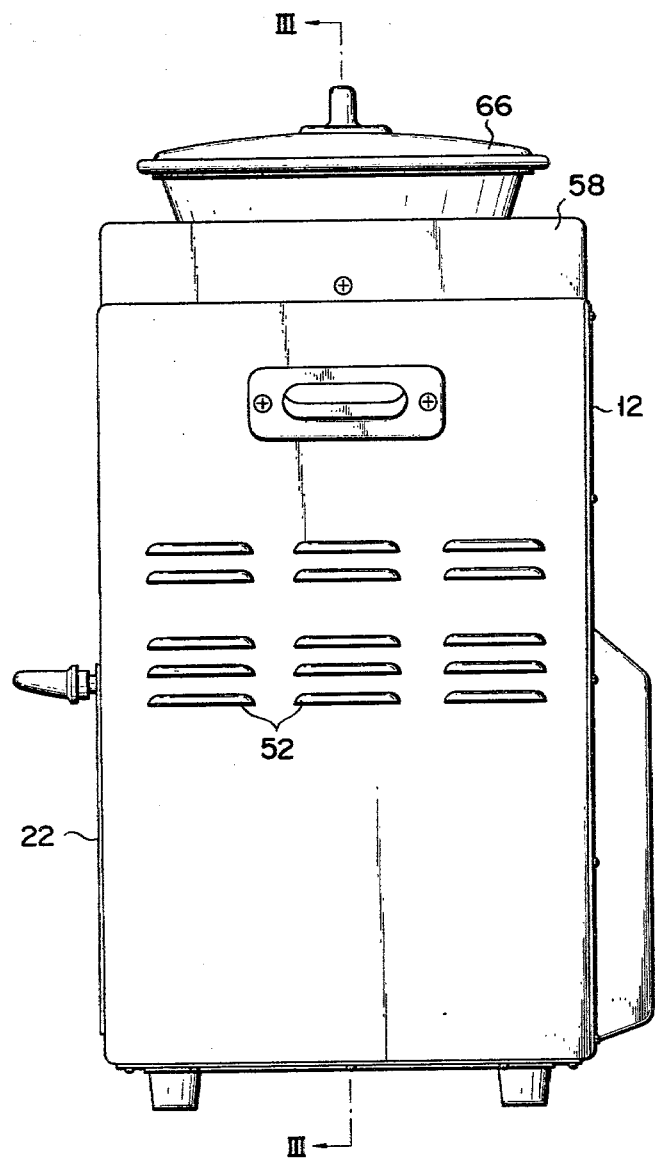
FIG. 2 is a right side view showing the cooking apparatus of FIG. 1.

Referring to FIGS. 1 to 4, a cooking apparatus 10 according to one embodiment of this invention includes a substantially box-like housing 12. The box-like housing 12 is divided by partition means 14 into upper and lower chambers 18 and 20, the partition means 14 comprising a partition plate 16 made of a heat insulating material. An oven housing 26 is disposed in the lower chamber 20 having an oven chamber 24 defined therein, and the oven chamber 24 has an openable, hinged door 22 at one side. The door 22 of the oven housing 26 confronts a mounting recess 28 formed at the front side of the oven housing 26. The oven housing 26 has its bottom surface fixed by a plurality of mounting legs 30 to the box-like housing 12 of the apparatus. A latching frame 32 (see FIG. 4) bent in a crank-like fashion is fixed to the marginal edge of the oven housing 26. The latching frame 32 is latched, through a heat insulating packing 36, to a flange 34 formed on the marginal edge of the mounting recess 28 of the box-like housing 12. A pair of baking heaters 38 such as an electric heater are attached by a latching means 40 and retainer 42 to the upper and lower inner surfaces of the oven housing 26. A retaining member 44 is mounted on the opposite side surfaces to support shelf plates (not shown). A fermenting heater 46 is disposed on the lower surface of the oven chamber to permit the interior of the oven chamber to be preheated to a fermenting temperature.

Figure 3:
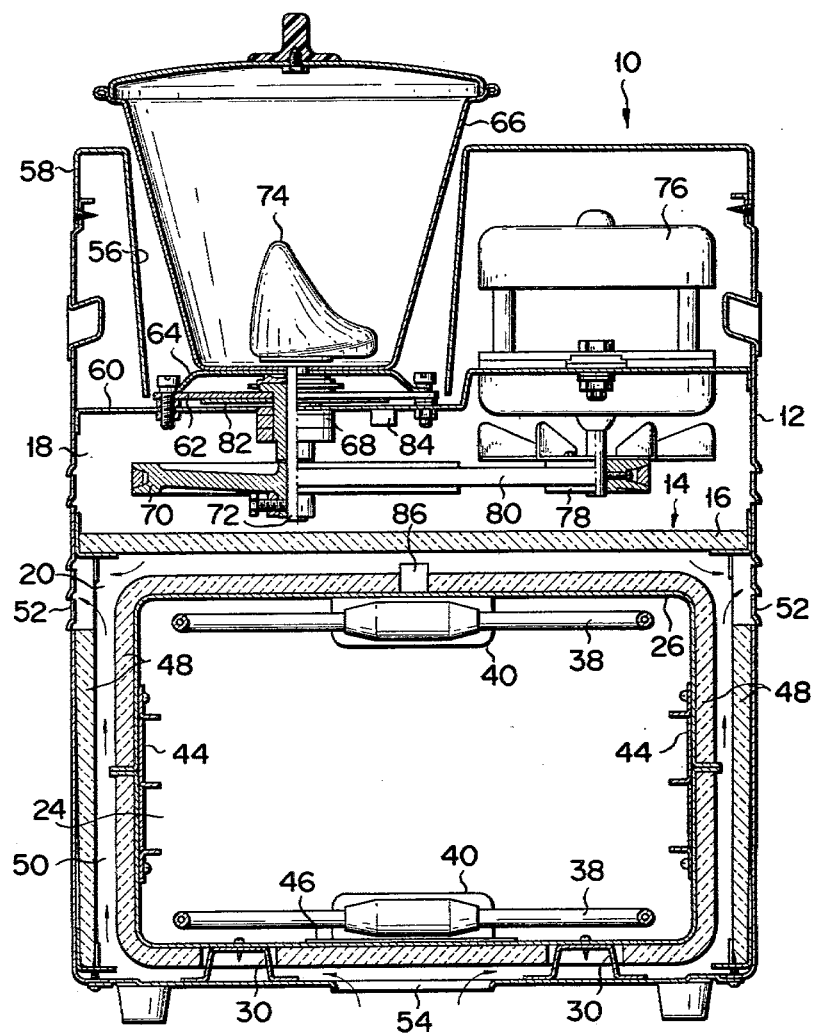
FIG. 3 is a longitudinal sectional view taken along line III—III of FIG. 2.
Figure 4:
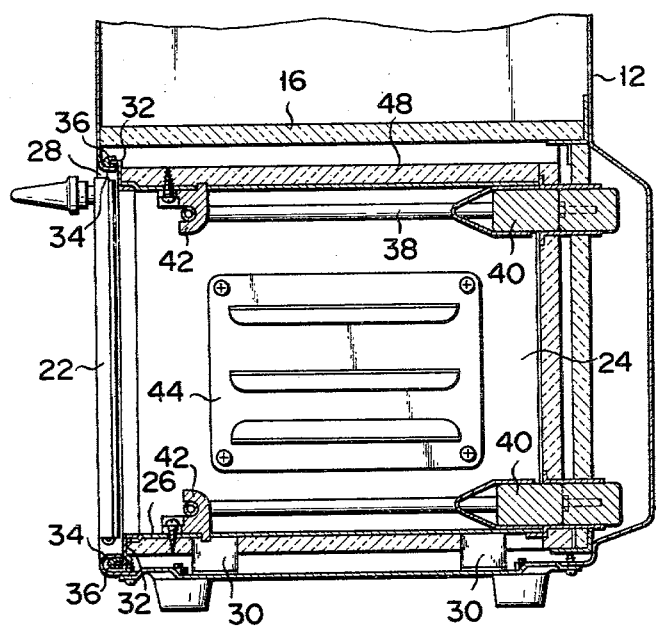
FIG. 4 is a longitudinal sectional view taken along line IV—IV of FIG. 1 with some parts omitted.
Figure 5:
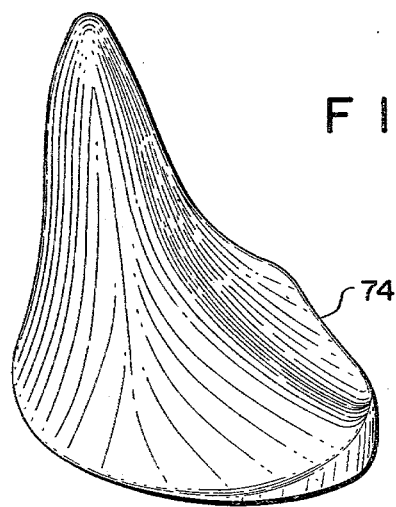
FIGS. 5 to 9 are a perspective view, front view, right side view, top plan view and bottom view, respectively, showing a kneading blade incorporated in the cooking apparatus.
Figure 6:
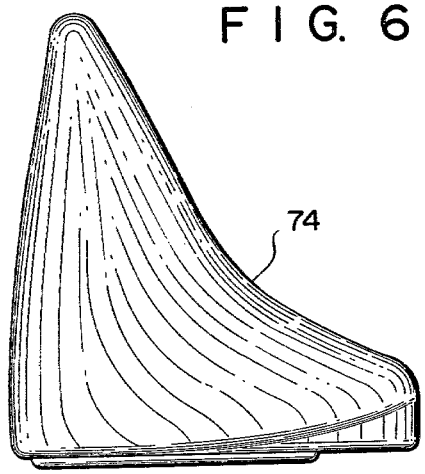
Figure 7:
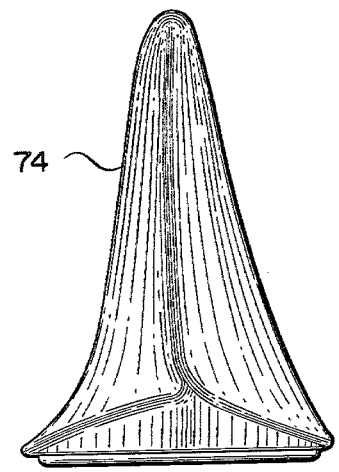
Figure 8:
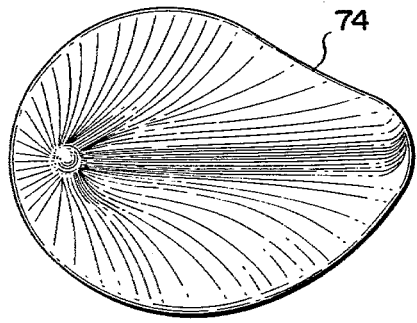
Figure 9:
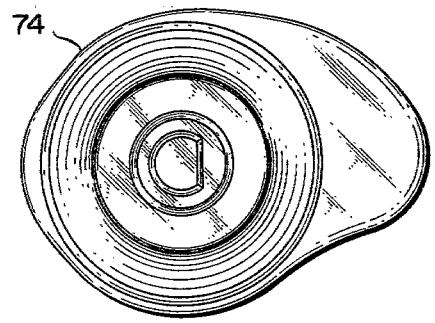

A heat insulating material 48 is attached to the outer surface of the oven housing 26 and to the inner surface of the lower chamber 29, and an air passage 50 is defined between the outer surface of the oven housing 26 and the inner surface of the lower chamber 20. A louver 52 is formed at the opposite side surfaces of the lower chamber 20 and a suction inlet 54 is formed in the lower wall of the lower chamber 20. When the interior of the oven chamber 24 is heated by the baking heater 38 to permit heat to be radiated from the surface of the oven housing 26, a natural convection of air is developed in the air passage 50 and hot air flows from the suction inlet 54 toward the louver 52 as indicated in FIG. 3, and it is discharged out of the housing 12. Since the oven housing 26 is fixed through the heat insulating packing 36 to the front surface of the box-like housing 12, the front surface of the housing 12 is prevented from being heated to a high temperature.

A cover 58 is disposed above the upper chamber 18 of the housing 12 and has a recess 56 and a mounting plate 60 is mounted in the upper chamber 18.

A bottom plate 62 is attached in the upper chamber 18 to provide a bottom of the recess 56. A contact plate 64 having a substantially inverted plate-like configuration is fixed to the bottom plate 62. A vessel 66 having its inner surface coated with Teflon is detachably mounted in the recess 56 such that the bottom surface of the vessel 66 is in contact with the contact plate 64.

A bearing 68 is fitted in the bottom plate 62 and a shaft 72 is rotatably journaled in the bearing 68 such that one end thereof extends into the vessel 66. A pulley 70 is fitted over the other end portion of the shaft 72. A kneading blade 74 to be later described is detachably mounted on that end of the shaft 72 which extends into the vessel. A motor 76 is attached to the mounting plate 60 through a buffer member (not shown). An endless belt 80 is entrained between the pulley 70 and a pulley 78 on a motor shaft to permit the blade 74 to be rotated. A fermenting heater 82 is mounted on the bottom plate 62 to heat the interior of the vessel to a fermenting temperature. That is, the interior of the vessel 66 is warmed through the bottom plate 62 and contact plate 64. The heaters 82 and 46 are controlled by a first thermoswitch 84 attached to that rear surface portion of the mounting plate 60 where the bottom of the vessel 6 is placed. By so doing, the interior of the vessel 66 and oven chamber 24 can be warmed to a fermenting temperature of about 38° C. The baking heater 38 is controlled by a second thermoswitch 86 fixed in contact with the outer surface of the oven chamber 24, and permits the oven chamber 24 to be heated to about 250° C.

On the front surface of the housing 12 are provided an operation switch section 88, exclusive time setter 90, automatic time setter 91, oven temperature setter 92, baking heater selection button 93 and buzzer 94. The operation switch section 88 comprises an OFF-switch 95, kneading switch 96, fermenting switch 97 and baking switch 98. By operating the switch on the operation switch section 88, the corresponding part or section of the apparatus is operated over a time period set by the exclusive time setter scale 90. The automatic time setter 91 includes a kneading/fermenting scale 99 and fermenting/baking scale 100. When an indicator on the kneading/fermenting scale of the automatic time setter 91 is set to a predetermined time and the kneading switch 96 and fermenting switch 97 are simultaneously operated, the kneading blade 74 in the vessel 66 is rotated and then the fermenting heaters 46 and 82 are energized, causing the interior of the vessel 66 and oven chamber 24 to be set to a temperature set by the first thermoswitch 84. In this way, kneading and fermenting can be effected according to the above-mentioned set time. If in this case the kneading blade 74 is further driven for several minutes, dough fermented in the vessel 66 can be degassed. Since the oven chamber 24 is preheated by the fermenting heater 46 for the oven chamber, yeast fungi are prevented from being killed due to the dough being cooled which would occur if the dough is placed in the oven chamber before the oven chamber is preheated by the baking heater 38. The baking switch 98 is operated with an indicator on the oven temperature setting scale 92 set to a predetermined temperature and an indicator on the fermenting/baking scale 100 of the automatic time setter set to a predetermined time. The oven chamber 24 is controlled by the second thermoswitch 86 to the set temperature. In this way, the oven chamber 24 is heated by the baking heater 38 to permit the dough to be baked. Upon completion of the operations set by the exclusive time setter 90 and automatic time setter 91, the buzzer 94 produces an alarm sound. The oven chamber 24 is heated by the baking heater 38 to about 250° C. For this reason, the temperature of the fermenting heater 46 in the oven chamber is influenced by heat from the baking heater 38 and can not be directly controlled by the first thermoswitch 84. The fermenting heater 82 for the vessel is connected in parallel with the fermenting heater 46 for the oven and the thermoswitch 84 adapted to sense heat from the heater 82 is mounted on a mounting plate 60 not influenced by the heat in the oven chamber 24. For this reason, the heater for the oven is not influenced by the heat in the oven chamber and has its temperature indirectly controlled by the thermoswitch 84. In consequence, the first thermoswitch 84 having a narrower temperature control range is prevented from being damaged by heat.

Recently, there has been a tendency that, in a bread making plant, dough is kneaded in immediate readiness for baking and then completely frozen for delivery to local distributors.

In this case, such a dough is bought from frozen retailer or a distributor and it is baked in the household, utilizing a bread baking device. It is only necessary that such dough be fermented and baked in a continuous fashion. According to this invention, such dough is placed in the oven chamber and the fermenting and baking switches 97 and 98 are simultaneously operated with the indicator on the fermenting/baking scale 100 in the automatic time setter 91 set to a predetermined time. By so doing, the dough in the oven chamber 24 is warmed, by the fermenting heater 46, for fermentation and the interior of the oven chamber is controlled by the thermoswitch 86 to a temperature set by the oven temperature setter 92 and the dough in the oven chamber is heated by the baking heater to permit the dough to be baked. In this way, a bread is obtained.

The shape of the kneading blade 74 imparts greater influence to the dough to be kneaded. Experiments have been made using various molded blades and a blade shape as shown in FIGS. 5 to 9 is found most suitable for agitation and kneading. The kneading blade is rotated in the clockwise direction (see a plan view in FIG. 8). In summary, this invention provides a cooking apparatus comprising an apparatus body of which the interior is divided by a partition plate into upper and lower chambers, an oven chamber defined in the lower chamber of the apparatus body and having a baking heater, a vessel disposed on the upper chamber and having a kneading blade, a drive mechanism disposed in the upper chamber to rotate the blade, and a fermenting heater disposed on the outer surface of the bottom of the vessel to warm the interior of the vessel to a fermenting temperature. The dough in the vessel can be kneaded and fermented in the vessel and the dough can be baked within the oven chamber. The arrangement permits kneading, fermenting and baking of the dough to be effected easily and reliably in a continuous way. Since kneading and fermenting are effected within a common vessel without providing any separate means, a small-sized apparatus can be obtained.

A fermenting heater for preheating the interior of the oven chamber and a fermenting heater for the vessel are disposed in the apparatus housing and adapted to be turned ON by a common thermoswitch, and thus, dough fermented in the vessel can be placed in the oven chamber without being either cooled or degraded. Since during the baking time the oven chamber is heated to a high temperature, the fermenting heater for the oven is indirectly controlled by the thermoswitch.

Since the thermoswitch for the fermenting heater is not subjected to thermal damage, the temperature control of the fermenting heater for the oven can be carried out satisfactorily and reliably.

The cooking apparatus of this invention can perform all the steps of kneading, fermenting and baking. If a kneading step only is necessary, the apparatus can be applied to the making of a mochi (Japanese rice cake), a dough for noodles and the like. The apparatus may also utilized for the cooking of a gratin etc.

What we claim is:

1. A cooking apparatus comprises an apparatus housing, partition means disposed in the apparatus housing to divide the apparatus housing into upper and lower chambers, an oven chamber defined in the interior of the lower chamber and having a baking heater, a vessel disposed on the upper chamber of the apparatus housing and having a shaft extending through the bottom wall of the vessel and an agitating and kneading blade fixed on the free end of the shaft inside the vessel, drive a mechanism disposed in the upper chamber and adapted to impart a rotation force to the shaft, and fermenting means disposed below the bottom of the vessel and having a fermenting heater for the vessel which heats the vessel to a fermenting temperature.

2. A cooking apparatus according to claim 1, in which the fermenting means further includes a further fermenting heater for the oven which is disposed in the oven chamber and adapted to, together with the fermenting heater for the vessel, be turned ON to permit the interior of the oven chamber to be heated.

3. A cooking apparatus according to claim 2, further including a thermoswitch coupled to the fermenting heaters for the vessel and the oven and adapted to sense the heat from the fermenting heater for the vessel to effect temperature control of the fermenting heater for the vessel and of the fermenting heater for the oven.

4. A cooking apparatus according to either one of claims 2 or 3 in which the oven chamber is defined by an oven housing spaced apart from the apparatus housing, a heat insulating material is disposed between the apparatus housing and the oven housing, and a heat radiating air passage is formed in the insulating material.

5. A cooking apparatus according to any one of claims 1, 2 or 3, in which the fermenting heater for the vessel imparts heat to the vessel through a heat conductive contact plate in contact with the bottom of the vessel.

* * * * *

UNITED STATES PATENT AND TRADEMARK OFFICE
CERTIFICATE OF CORRECTION

PATENT NO. : 4,202,257

DATED : May 13, 1980

INVENTOR(S) : Teruo MASUDA et al

It is certified that error appears in the above-identified patent and that said Letters Patent are hereby corrected as shown below:

Column 1, line 39, change "a" to --the--.
Column 3, line 27, change "6" to --66--;

Column 4, line 25, change "such a dough" to --such frozen dough--;

change "from frozen" to --from a--.

Signed and Sealed this

Twelfth Day of August 1980

[SEAL]

Attest:

SIDNEY A. DIAMOND

Attesting Officer            Commissioner of Patents and Trademark